Nov. 18, 1958   J. CHERONNET   2,860,513
LIQUID METER
Filed March 21, 1956   2 Sheets-Sheet 1
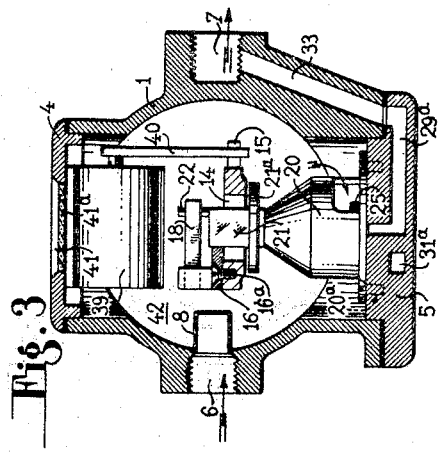
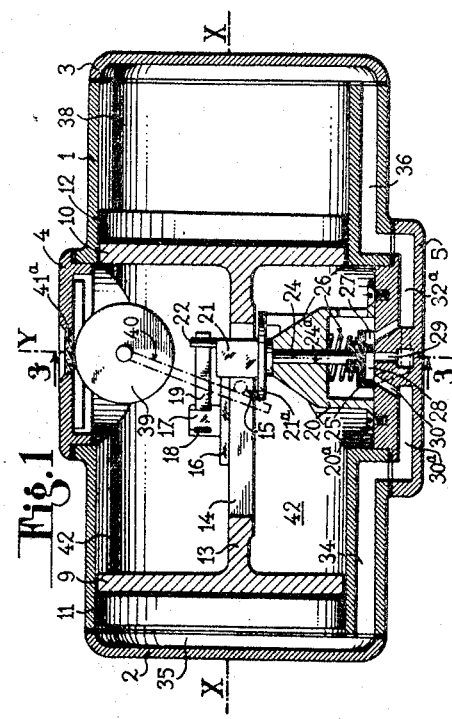
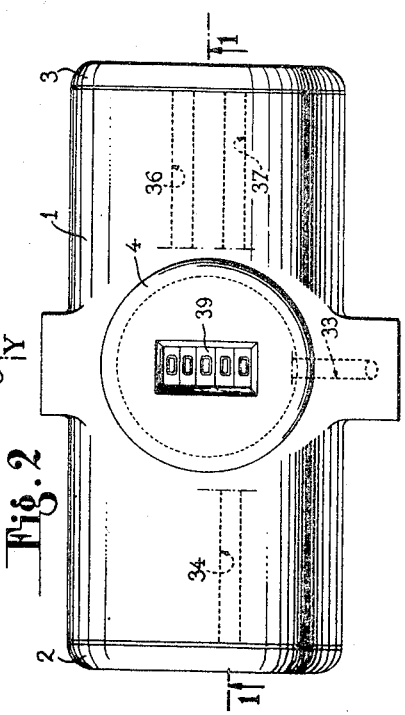

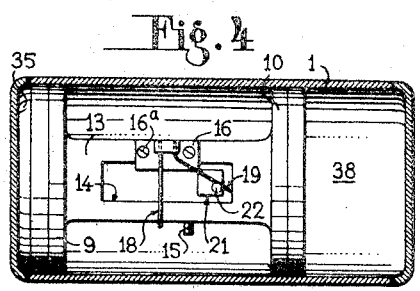
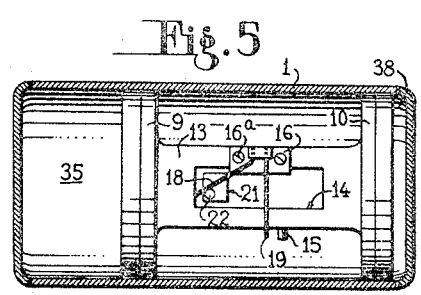
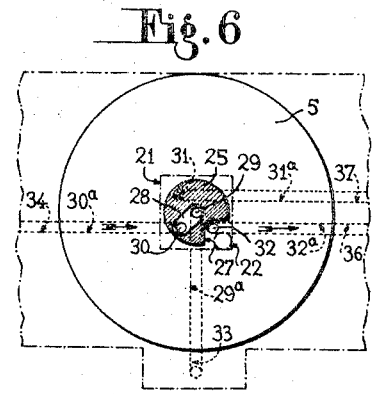
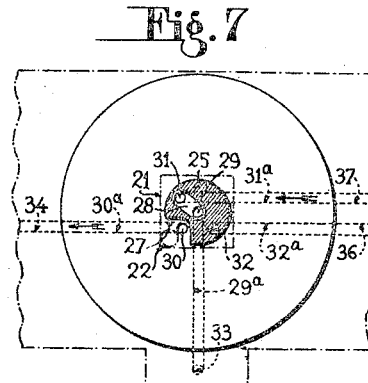
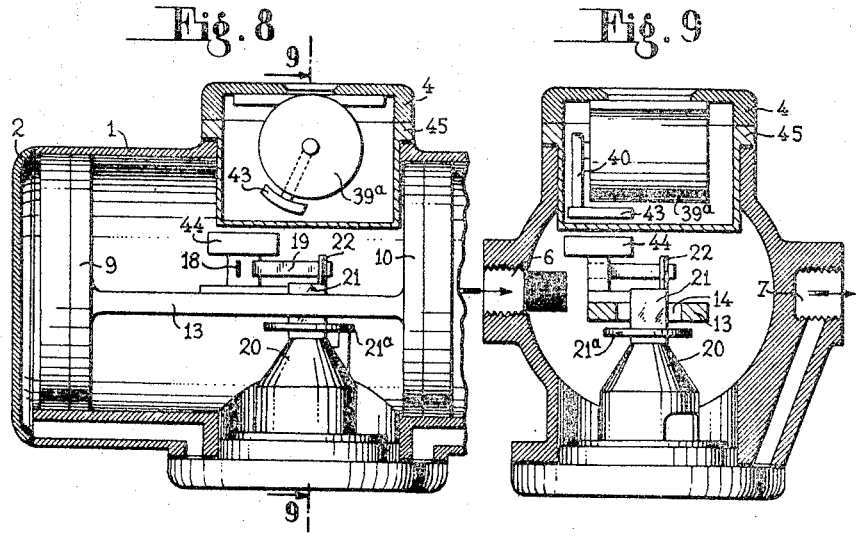

United States Patent Office 2,860,513
Patented Nov. 18, 1958

2,860,513

LIQUID METER

Jean Cheronnet, Paris, France, assignor to Ste: Compteurs et Moteurs Aster, Paris, France, a French body corporate Application March 21, 1956, Serial No. 572,941

4 Claims. (Cl. 73—251)

The present invention relates to meters for measuring the flow of liquids.

As is known, these meters generally conform to either of the following two types:

The first type, known as the fluid-tight type, generally comprises two moving assemblages each of which comprises two interconnected pistons, these two assemblages being arranged in the form of a cross and the pistons moving in a housing bored out to receive these pistons; provision is made in this housing for the admission and exhaust of the liquids on the rear faces of the pistons. The rectilinear reciprocations of the two assemblages causes the continuous rotation of a crank-shaft actuating a slide whose action in each assemblage is to alternately put one of the cylinders in its filling position and the other in its emptying position. This crank-shaft furthermore actuates a counter which counts the number of rotations of the crank-shaft and hence measures the volume of liquid supplied, this counter being disposed outside the meter.

This first type of meter, in current industrial use, is suitable for large flows. In practice, the smallest meters permit a liquid flow of 2,500 litres per hour (for example, those used in gas station pumps), and the largest meters permit a flow up to 100,000 litres per hour. Such meters do not permit descending much below the above-mentioned lower limit, owing to the space taken up by the crank-shaft transmission between the movable assemblages, the rotating slide distributor and the counter.

The other type of meter comprises a rotor continuously rotated by the flow of the liquid. This meter may be constructed to permit small flows, but it has a very serious disadvantage in that its accuracy considerably decreases with the flow owing to the leakage of liquid, which introduces a systematic error in the recorded flow and is proportionally the greater as the flow is smaller.

The object of the invention is to provide a meter of the first-mentioned type so improved as to be of use not only for large flows but also and above all for small flows, the dimensions of the meter obviously depending on the flow.

This meter, which is simple in construction, cheap, highly accurate and sound in operation, is characterized in that it comprises in combination: a single movable assemblage having two pistons which are connected by a rigid distance member and are movable in two coaxial cylinders, an oscillating distributor disposed in the central chamber of the meter between the two pistons, a counter disposed in the housing of the meter, and connecting means between the distance member and the distributor and between the distance member and the counter, whereby the distance member actuates the distributor and the counter in accordance with the movements of the pistons.

In a preferred embodiment, the distance member connecting the two pistons comprises a flat face of determined length which moves in contact with a square-ended shaft rigid with the distributor, which is thus held in position while said face is in contact with the square end, the latter being disposed between two elastically yieldable means connected to said face and so arranged that one or the other of these means is put under stress when the movable assemblage moves in one direction or in the other and oscillates the distributor as soon as the square end leaves said face.

Further features and advantages of the invention will be apparent from the ensuing description with reference to the accompanying drawings to which the invention is in no way restricted.

In the drawings:

Fig. 1 is a vertical longitudinal sectional view of a meter embodying the invention;

Fig. 2 is a plan view thereof;

Fig. 3 is a sectional view taken along line 3—3 of Fig. 1;

Figs. 4 and 5 are diagrammatic views of the movable assemblage in its two extreme positions and the corresponding positions of the yieldable means and of the square end controlling the distributor;

Figs. 6 and 7 are plan views of the corresponding positions of the distributor;

Fig. 8 is a view similar to Fig. 1 of a modification of the invention, and

Fig. 9 is a sectional view taken along line 9—9 of Fig. 8.

In the embodiment shown in Figs. 1 to 7, the meter comprises a housing or body 1 provided with a longitudinal bore having an axis X—X and closed at each end by caps 2 and 3. This housing is provided with another bore having an axis Y—Y perpendicular to the first-mentioned bore and closed by two other caps or plates 4 and 5. An inlet connection 6 and an outlet connection 7 (Fig. 3) are also provided in the housing 1. The connection 6 may be provided with a filtering strainer 8.

Slidable in the two coaxial parts of the bore having axis X—X are two pistons 9 and 10 each provided with sealing washers 11 and 12. These pistons are interconnected by a rigid web or plate 13 forming a distance member and constituting with the two pistons a movable assemblage.

An aperture 14 is formed in the web 13 and the latter is provided with a lateral finger 15. A rectangular plate 16 is fixed on the web 13, as by screws 16ᵃ, and is disposed on both sides of a projection 17 which serves as a support for two blade springs 18 and 19.

A support 20, connected by screws 20ᵃ to the cap 5, permits holding in position an operating shaft 21 having at least two adjoining flat faces and preferably square in cross-section and provided with a flange 21ᵃ. The pistons are prevented by this flange from rotating about their axis X—X.

The square end 21 is provided on its upper face with an eccentric pin or lug 22 disposed adjacent one of the corners of the square. This pin is co-operable with the springs 18 and 19. The square end or shaft 21 has an extension 24 which is freely rotative in a bore 24ᵃ formed in the support 20 and has an axis Y—Y. The journal 24 is shaped at its lower end so as to enter in the manner of a screw driver or key in a slot formed in a distributor 25, a spring 26 being disposed between the latter and the support 20 so that the distributor 25 is urged against the upper face of the cap 5.

The distributor 25 comprises a lateral aperture 27 (Figs. 1, 6 and 7), in communication with the interior of the housing 1 as will be explained hereinunder, and a radial aperture 28.

Four ports 29, 30, 31 and 32, extended by passageways, are formed in the cap 5. The port 29 is disposed on the axis Y—Y and the passageway 29ᵃ extending this port 29 communicates through a passageway 33 in the housing with the outlet aperture or connection 7 (Fig. 3). The port 30, extended by the passageway 30ᵃ (Fig. 1), communicates through a passageway 34 in the housing 1 with a chamber 35 formed between the cap 2 and the piston 9. The ports 31 and 32, extended by passageways 31ᵃ and 32ᵃ in the cap 5, are in communication through passageways 36 and 37 in the housing with a chamber 38 formed between the cap 3 and the piston 10.

The cap 4 is provided with a counter disposed inside the housing 1. The counter 39 shown in this embodiment is a simple apparatus having numbered drums operated in an alternating manner by the action of the finger 15 on an actuating lever 40 of the counter. The lever is spring-loaded by a spring disposed inside the counter. The numbers are read off the counter through a window 41 provided with a fluid-tight glass 41ᵃ.

It will be understood that the caps 2, 3, 4 and 5 and the counter 39 are mounted in the housing 1 in a perfectly fluid-tight manner.

The meter operates in the following manner:

The operational stage corresponding to the positions shown in Figs. 1, 4 and 6 will first be described, the distributor being in the position shown in Fig. 6.

The liquid to be measured arrives under a certain pressure through the connection 6 and enters the chamber 42 between the body 1 and the pistons 9 and 10. This liquid passes through the aperture 27 of the distributor 25, the port 32, the passageways 32ᵃ and 36, and reaches the chamber 38 where it exerts a pressure on the face of the piston 10 which causes the pistons 9 and 10 to move to the left as seen in Fig. 1. The liquid in the chamber 35 is expelled through the passageway 34, the passageway 30ᵃ, the port 30, the aperture 28, the port 29, the passageways 29ᵃ and 33, and the outlet connection 7.

In the course of the movement to the left of the pistons, the plate 16 slides along one of said flat faces of the square end or shaft 21 thereby preventing the rotation of this square end and maintaining the distributor 25 in correct angular position. The spring 19 which bears against the pin 22 is progressively put under stress as the pistons move to the left.

The extreme left position of the pistons is reached when the plate 16 is no longer in contact with the square end (the position shown in Fig. 4). At this moment the spring 19 rotates the square end 21 one quarter of a revolution and causes the distributor 25 to assume the position shown in Fig. 7, the square end 21 passing from the position shown in dot-dash line on an enlarged scale in Fig. 6 to that shown in Fig. 7.

Thereupon the second operational stage of the meter commences, the chamber 35 being supplied with liquid through the path 27, 30, 30ᵃ and 34, and the chamber 38 being connected to the exhaust through the path 37, 31ᵃ, 31, 28, 29, 29ᵃ, 33 and 7.

It will be observed that only chamber 38 has two passageways 36 and 37 connected to the ports 31 and 32 which are alternately closed and opened as shown in Figs. 6 and 7.

In the course of the movement of the movable assemblage to the right as seen in Fig. 5, the plate 16 slides along said second face of the square end or shaft 21, once more holding the latter stationary and thereby maintaining the distributor 25 in its new position. The spring 19 is progressively released with this movement and finally loses contact with the pin 22; the second spring 18 enters into contact with the latter and is progressively put under stress until the pistons reach the extreme right position shown in Fig. 5. As soon as the plate 16 loses contact with the square end, the spring 18 causes a further fractional rotation of the square end and the distributor 25. When the latter returns to the position shown in Fig. 6, the movement to the left recommences.

The two chambers 35 and 38 are therefore, as explained hereinabove, connected alternately to the supply and exhaust of the liquid to be measured. In one complete cycle of the alternating movement of the pistons the volume of liquid supplied is double that of a full cylinder. It is easy to set the value of this volume to the indications of the counter. In the above-described counter 39 having an alternating movement, the finger 15 of the web 13 moves the lever 40 when the pistons move to the left as seen in Fig. 1. The movement of the lever 40 causes the rotation of the first drum; when the pistons move to the right, the lever 41, which is automatically returned by the mechanism of the counter, follows the finger 15 in its movement to the right. Thus there may be in the indication of the counter an inaccuracy or some doubt which may be as much as the volume of one full cylinder, but the resultant error in the indications is absolutely negligible as soon as the recorded figure, corresponding to the number of cylinders supplied, is not very small.

The adjusting or setting of the meter is easily achieved by using a plate 16 of suitable length; it suffices to have at one's disposal a set of plates of different lengths to change from one setting to another. The required plate is easily fixed in position by the screws 16ᵃ.

In the embodiment shown in Figs. 8 and 9, the counter 39, which is of the above-mentioned type, is characterized by the fact that its operation, that is the rotation of the lever 40, is obtained by means of a magnet 43 mounted on the latter. This magnet follows the movements of another magnet 44 mounted on the web 13 between the pistons. The translational movements of the magnet 44 are therefore transformed into swinging movements of the lever 40.

This arrangement permits completely closing off the counter from the supplied liquid. The counter is therefore disposed inside a fluid-tight case 45 interposed between the housing 1 and the cap 4.

Although specific embodiments of the invention have been hereinabove described, many modifications and changes may be made therein without departing from the scope of the invention as defined in the appended claims.

Having now described my invention what I claim as new and desire to secure by Letters Patent is:

1. In a liquid meter of the fluid-tight type in combination: a fluid-tight housing comprising two coaxial cylinders disposed on either side of a central chamber, a single movable assemblage comprising two pistons each of which is movable in one of said cylinders, and a rigid distance member interconnecting the pistons; a distributor capable of being oscillated disposed in the central chamber between the two pistons; a counter disposed in the housing; first connecting means operatively connecting the movable assemblage to the distributor, these connecting means comprising a first flat face of determined length disposed on the distance member, a shaft rigid with the distributor and having two laterally adjoining flat faces extending longitudinally of the shaft and arranged to form a dihedral portion, said first face being capable of slidably engaging one of said shaft faces in the course of movement of the pistons in the cylinders in one direction and the other of said shaft faces in the other direction of piston movement so that the distributor is held stationary while said first face is in contact with either of said shaft faces, two elastically yieldable means connected to the distance member and between which said shaft is disposed, the arrangement being such that one of said yieldable means is put under stress in one direction of movement of the movable assemblage and the other yieldable means is put under stress in the other direction of movement whereby the distributor is oscillated by one of the yieldable means as soon as one of said shaft faces leaves said first face; and second connecting means connecting the distance member to the counter to actuate the latter as a function of the movements of the pistons.

2. The structure as claimed in claim 1, wherein said yieldable means comprise two blade springs which are parallel in their inoperative positions and participate in the movements of said distance member.

3. The structure as claimed in claim 1, wherein a plate is attached to the distance member, one lateral face of this plate forming said first flat face.

4. In a liquid meter of the fluid-tight type, in combination; a fluid-tight housing comprising two coaxial cylinders disposed on either side of a central chamber, a plate having a surface forming one of the walls of the central chamber, an inlet aperture admitting liquid into said central chamber, and a liquid outlet passageway formed within the wall of said housing and opening into said chamber through said plate; a single movable assemblage comprising two pistons each movable in one of said cylinders and forming an end chamber, and a rigid distance member interconnecting said pistons; a first passageway connecting said central chamber to one of said end chambers, and a second passageway connecting said central chamber to the other of said end chambers, both passageways opening into said central chamber through said plate surface; the improvement of a distributing device connected to said plate, comprising a distributor member surmounting the openings formed in said plate, held in pressure contact against said plate, and capable of being rotatably oscillated between first and second positions; said member having a lateral aperture providing fluid communication between said central chamber and either said first or said second passageway, depending on which of said two positions is occupied; said member also having a connecting passageway extending between said outlet passageway and the other one of said first or second pasasgeways; and, a first connecting means operatively connecting said distance member to said distributor member, and a second connecting means operatively connecting the distance member to a counter; whereby the distance member actuates the distributor member and the counter as a function of the movements of the pistons, and said distributor member is rotatably oscillated between said two positions providing alternate fluid communication between said central chamber and one of said end chambers.

References Cited in the file of this patent

UNITED STATES PATENTS

| | | |
|---|---|---|
| 136,363 | Clausolles | Mar. 4, 1873 |
| 188,215 | Wells | Mar. 6, 1877 |
| 319,992 | Norfolk | June 16, 1885 |
| 369,595 | Dietzman et al. | Sept. 6, 1887 |
| 474,241 | Goodman | May 3, 1892 |
| 748,778 | Nash | Jan. 5, 1904 |
| 888,481 | Fritsch | May 26, 1908 |
| 1,266,697 | Macartney | May 21, 1918 |
| 1,335,953 | Babson | Apr. 6, 1920 |

FOREIGN PATENTS

| | | |
|---|---|---|
| 13,140 | Great Britain | June 27, 1891 |